July 15, 1969     A. W. R. ALLCOCK     3,455,111
APPARATUS FOR RAPIDLY DIVERTING THRUST PRODUCED BY A JET ENGINE
Filed June 21, 1965     4 Sheets-Sheet 1

Alastair William Rodney Allcock
*Inventor*

By
Stevens, Davis, Miller & Mosher Attorneys

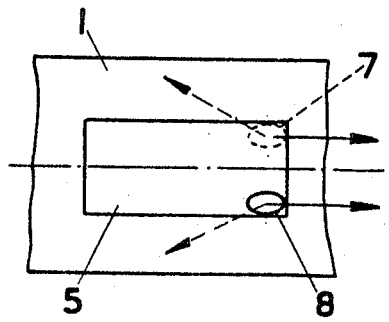
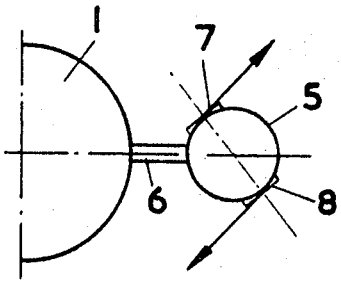
FIG. 3.        FIG. 4.
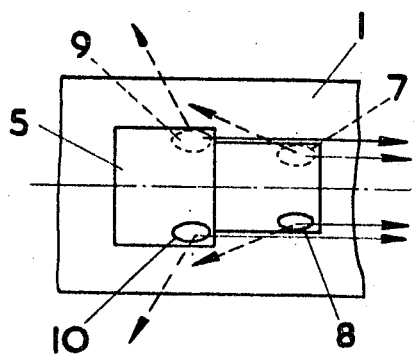
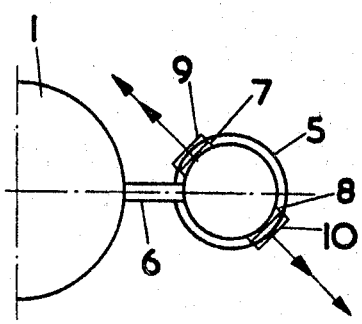
FIG. 5.        FIG. 6
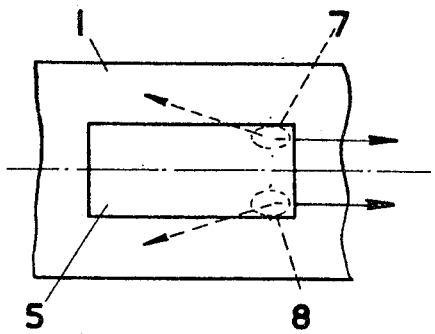
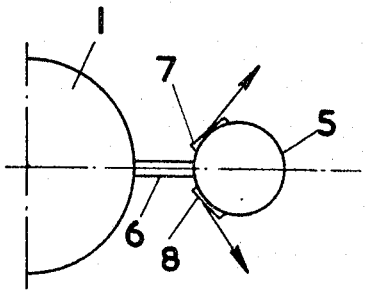
FIG. 7.        FIG. 8.

United States Patent Office 3,455,111
Patented July 15, 1969

3,455,111
APPARATUS FOR RAPIDLY DIVERTING THRUST PRODUCED BY A JET ENGINE
Alastair William Rodney Allcock, Northwood, Middlesex, England, assignor to Power Jets (Research and Development) Limited, London, England
Filed June 21, 1965, Ser. No. 465,402
Claims priority, application Great Britain, June 23, 1964, 25,893/64
Int. Cl. F02k *3/02, 1/24*
U.S. Cl. 60—226  8 Claims

ABSTRACT OF THE DISCLOSURE

An aircraft with gas-turbine engines carried in external pods having swiveling propulsion nozzles. The turbine efflux of each engine is discharged through a pair of nozzles situated on opposite sides of the particular pod and located on an axis inclined at approximately 45° to the transverse axis. The nozzles swivel in unison but in opposite senses to rotate their thrust lines from a normal to a reversed position. Where the engines are of the by-pass type, additional nozzles, disposed forwardly of those first mentioned, are provided for the discharge of by-pass air. The additional nozzles are similarly arranged and swivel in unison with the others. In an alternative arrangement, by-pass nozzles are located on the inboard sides of the pods and turbine-efflux nozzles on the outboard sides.

---

This invention relates to aircraft of the type having gas turbine jet propulsion engines.

Some of the most difficult and dangerous problems currently encountered by aircraft occur during approach and landing. One of the more common incidents is over-running the end of the runway usually because of too high an approach speed, limited runway friction, or a combination of both. Short range aircraft, by their very nature, complete a larger number of landings in relation to flying time than long range types. These landings are frequently at secondary airports where runways tend to be short.

The problems are accentuated in aircraft having swept-back wings where large changes in angle of attack are necessary to produce a comparatively small variation in coefficient of lift under the flight conditions prevailing during landing manoeuvres. Furthermore, jet propelled aircraft do not have the benefit of the slipstream-induced increase in lift which can be obtained with a propellor-driven aeroplane.

Thrust reversal is a well-known means of reducing the landing run and is particularly beneficial on wet runways. Various forms of thrust modulation or reversal apparatus for both propellor driven and jet propelled aircraft have been proposed and used. In general, jet thrust reversers include separate forward and reverse nozzles and some form of deflector to divert the jet stream from one to the other. These normally involve the throttling-back of the engine before the deflector can be operated. Reversal of thrust therefore entails a time lag during the engine deceleration-acceleration period which might well be critical.

The instant at which thrust reversal is applied relative to the alighting point can be of great consequence and the ability to select or even apply reversal before touchdown is obviously a most important consideration. Due to the nature of known reversal mechanisms and safety considerations this has not hitherto been a practical proposition.

The present invention is therefore directed to the provision of means for effecting full thrust modulation in an aircraft of the type specified without the need for engine throttling back. Provision is also made for continuous and very rapid modulation of thrust from fully forward to fully reversed at any stage of flight.

According to the invention a thrust diverting system for an aircraft includes at least one pair of jet propulsion nozzles arranged to discharge fluid streams and mounted for rotation between positions in which the fluid streams are discharged rearwardly at positions in which the fluid streams are discharged forwardly, and means for rotating the nozzles of each pair in synchronism in opposite directions between said positions whereby during transitional movement of the nozzles the fluid stream from one nozzle is inclined upwardly and the fluid stream from the other nozzles is inclined downwardly the inclination of each fluid stream being substantially the same.

In one form of the invention a pair of nozzles is arranged symmetrically about a horizontal plane passing through the longitudinal axis of associated jet propulsion means. A pair of nozzles may be disposed transversely about an aircraft power plant, each nozzles being opposite to the other on a diametrical axis which is inclined to the vertical plane passing through the longitudinal axis of the power plant.

In a preferred form of the invention an aircraft has two gas turbine power plants arranged as set out above and disposed symmetrically about the fuselage.

In a modification of the invention a power plant is provided with at least one further pair of jet propulsion nozzles situated forwardly of the first mentioned nozzles and similarly arranged, wherein compressed air is discharged from the forward nozzles and turbine efflux from the rear nozzles. The compressed air is preferably supplied by a separate by-pass compressor.

A number of embodiments of the invention will now be described by way of example with reference to the accompanying diagrammatic drawings of which:

FIGURES 3 and 4 are respectively views from the side and rear of a power plant and part of the aircraft, and FIGURES 5 and 6, 7 and 8, 9 and 10, 11 and 12, and 13 and 14 are views corresponding to FIGURES 3 and 4 respectively of various alternative embodiments, the same reference numbers being used for corresponding parts.

Figure 15:
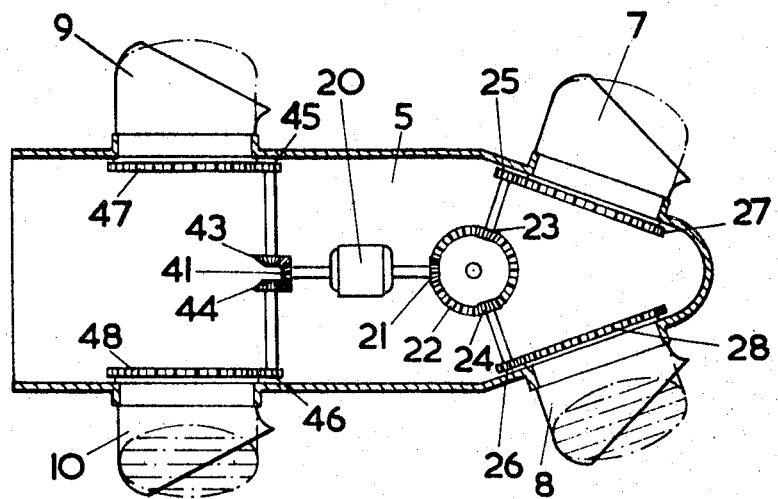

FIG. 15 is a cut away view of a power plant showing nozzle rotating means.

Figure 16:
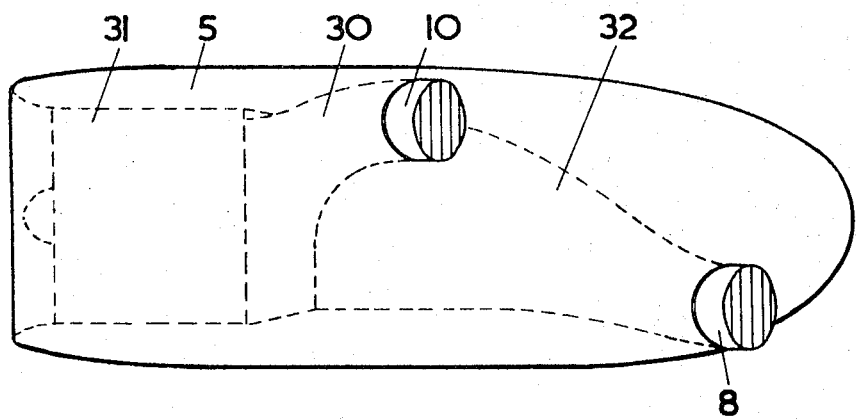

FIG. 16 is a view of a power plant showing ducting between the engine and nozzles.

The aircraft comprises a fuselage 1 with swept-back wings 2, and high mounted tailplane 3, carried at the top of a vertical fin 4. By-pass gas turbine jet propulsion engines power plants 5 mounted in pods are located externally on either side oft he rear of the fuselage and the pods are attached thereto by pylons 6. The engine jet streams are discharged through nozzles 7, 8 situated towards the rear of the power plants; the nozzles 7 are mounted on the inboard upper sections of the power plants, while the nozzles 8 are diametrically opposite on the outboard lower section of the power plants.

Figure 1:
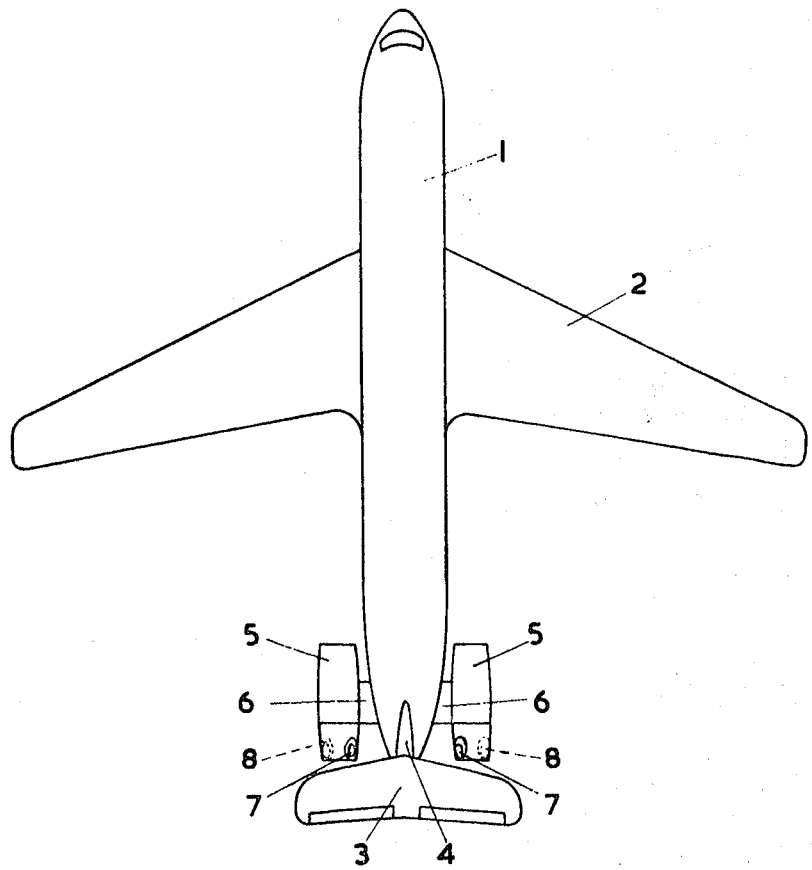
FIGURE 1 is a view from above of an aircraft having power plants with thrust reversal nozzles.
Figure 2:
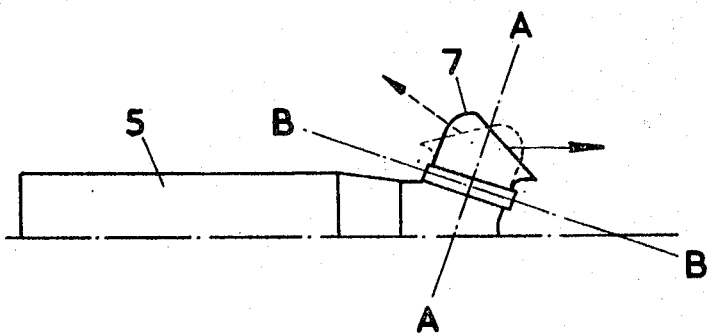
FIGURE 2 is a side view of part of a power plant of the aircraft of FIGURE 1, on a larger scale.

Referring to FIGURE 2, the nozzles 7 (and nozzles 8 similarly) are journalled for rotation about axis AA such that their plane of rotation, denoted by BB, is inclined from the centre-line of the power plant. The normal direction of discharge is rearwardly and substantially parallel to the line of flight as indicated by the solid arrow. To this end the nozzles are provided with internal guide vanes (not shown) suitably positioned and spaced. As may be seen from FIGURE 3, the nozzles 7, 8 are arranged to rotate simultaneously in opposite senses to a reversed position as indicated in dotted lines. It may be seen that, due to inclination of the axis of rotation, the line of thrust (indicated by the dotted arrow) although generally directed forwardly is also directed outwardly in relation to the power plant.

The rotation of the nozzles may be affected by any suitable means such as mechanical or electrical drive, pneumatic or hydraulic actuation, under the control of the pilot; an extremely rapid rate of response can be brought about by electro-pneumatic operation.

One arrangement is shown in FIG. 15. An electric motor 20 turns a bevel gear 21 which meshes with a large bevel gear 22. Bevel gears 23, 24 transmit drive from the large bevel gear 22 to pinions 25, 26 meshing respectively with rings of gear teeth 27, 28 formed around the bases of the nozzles 7, 8.

In FIGURE 4 the nozzles are indicated as being in the mid-position such as might be selected during the latter stages of a landing approach since the nozzles may then be rapidly rotated to give reversed thrust for braking or an almost instantaneous reapplication of normal full power thrust in emergency. (The mid-positions of the nozzles are also shown in dotted lines in FIG. 15.) The disposition of the nozzles around the power plant is such that the jet streams are at all times directed away from the aircraft structure thus avoiding interference therewith or with the air-flow over the structure.

A major difficulty encountered with any form of thrust reversal arrangement is engine reingestion of the reversed flow, leading to serious loss of performance. In the arrangement of FIGURES 5 and 6 an additional pair of nozzles 9, 10 is provided on each power plant forwardly of the original pair and with their axes in the same radial plane. The forward pair of nozzles is supplied with air from the engine by-pass system. In the reversed position the hot gas discharged from the nozzles 7 and 8 is at an acute angle to the power plant centre-line where a large proportion of the gross thrust will act forwardly and the air discharge from the nozzles 9 and 10 is at a much larger angle and serves to divert the hot gases clear of the engine intake.

Referring again to FIGURE 15, the nozzles 9, 10 are also rotated by the electric motor 20 which turns a bevel gear 41 meshing with bevel gears 43, 44 which serve to transmit drive to pinions 45, 46 which engage rings of gear teeth 47, 48 formed around the bases of the nozzles 9, 10.

In the embodiments described so far, with the nozzles rotated to an intermediate position, there will be a rolling moment produced. Where both engines are producing similar values of thrust the mean moments will be substantially balanced but, in the case of engine failure or unequal thrust, an unbalanced rolling moment will be applied to the aircraft.

FIGURES 7 and 8 illustrate a variation of the basic two nozzle arrangement in which nozzle 8 is placed on the inboard lower section of the power plant (i.e., on the same side as nozzle 7 but below it). In this way the unbalanced rolling moment resulting from failure of one engine is eliminated leaving only a yawing moment which should be readily controllable.

Figure 9:
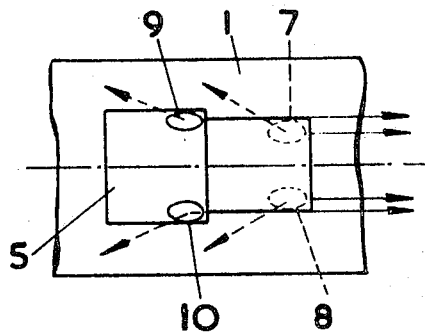
Figure 10:
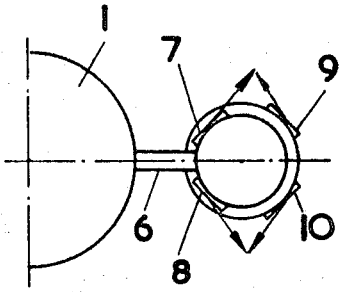

FIGURES 9 and 10 illustrate a similar variation to the previous example applied to the nozzle arrangement disclosed in FIGURES 5 and 6. The hot gas nozzles 7, 8 are located on the upper and lower inboard sections of the power plant and the air nozzles 9, 10 on the upper and lower outboard sections. The out of balance forces which might occur would be in yaw and the hot flow is at all times diverted away from the fuselage.

Referring now to FIG. 16, a duct 30 connects the by-pass system of the engine 31 with the nozzle 10 and the hot gases discharged by the engine are fed to the nozzle 8 by duct 32. Similar ducts connect the nozzles 9 and 7 (not shown) with the engine.

Figure 11:
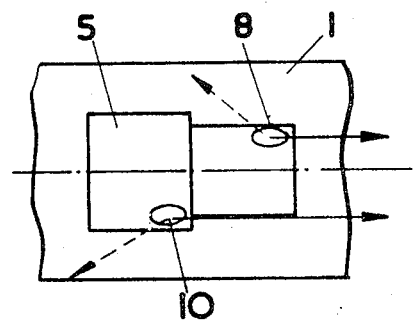
Figure 12:
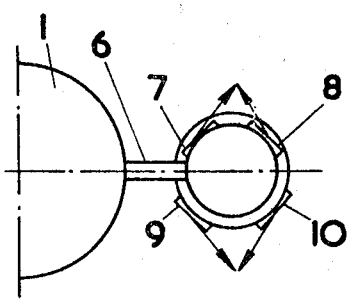

In FIGURES 11 and 12 the hot gas nozzles 7, 8 are located on the upper sections of the power plant and the air nozzles 9, 10 on its under surfaces. The hot flow is therefore directed above the aircraft and not towards the runway whereby it might have been deflected into the path of the engine intake. Any unbalanced forces would tend to produce a pitching moment on the aircraft.

Figure 13:
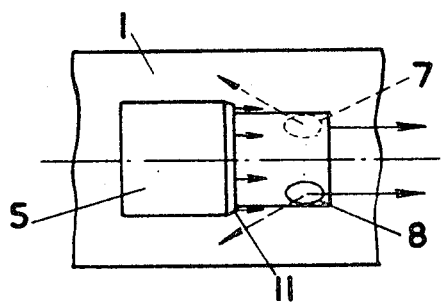
Figure 14:
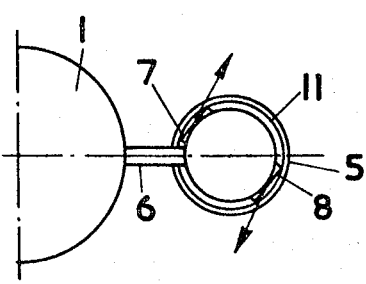

In the arrangement of FIGURES 13 and 14, applicable to engines having a low by-pass ratio, the turbine efflux is discharged through nozzles 7, 8 as in previous examples while by-pass air issues from a rearwardly directed annular nozzle 11 located around periphery of the power plant forwardly of the hot gas nozzles. The by-pass flow is not subjected to the losses arising from the deflections involved in rotatable nozzles but will serve to prevent flow attachment and ingestion from the hot gas nozzles when they are in the reversed thrust position.

Although the embodiments illustrated are in relation to a rear-engined aircraft, the invention is equally applicable to other forms such as one having engines buried in the wing roots or in underwing pods. In the latter case, the nozzles would be displaced from the vertical diameter of the pod by a comparatively small angle so that the discharge through them is at all times directed away from the fuselage and wing structure.

I claim:

1. An aircraft power plant comprising at least one pair of jet propulsion nozzles and a gas turbine engine connected to supply fluid to the nozzles for discharge therefrom, said pair of nozzles being mounted for rotation between positions in which the fluid discharged by the nozzles will be directed simultaneously in a rearward direction to produce forward thrust and positions in which the fluid discharge will be directed substantially forwardly, the nozzles being spaced apart about the transverse periphery of the power plant with their respective axes of rotation inclined to the transverse lateral and vertical axes of said power plant, and means for rotating said nozzles in synchronism between said positions but in opposite senses such that during transition the fluid discharged from one nozzle will be directed generally upwardly relative to the power plant and the fluid discharged from the other nozzle will be directed generally downwardly relative thereto.

2. An aircraft power plant according to claim 1 in which the gas turbine engine is of the by-pass type connected to supply turbine efflux to a pair of nozzles as aforesaid for discharge therefrom, and separate means are provided for the discharge of by-pass air.

3. An aircraft power plant according to claim 2 in which the means for the discharge of by-pass air comprises a further pair of nozzles disposed forwardly of the turbine efflux discharge nozzles and similarly rotatable in opposite senses in synchronism with each other and in synchronism with the turbine-efflux discharge nozzles.

4. An aircraft power plant according to claim 1 in which a pair of nozzles are located on opposite sides of the power plant to each other with their axes of rotation coincident.

5. An aircraft having at least two power plants each comprising two pairs of jet propulsion nozzles and a gas turbine engine connected to supply turbine efflux to one pair of nozzles and by-pass air to the second pair of nozzles, said second pair being disposed forwardly of the first pair, each pair of nozzles being mounted for rotation between positions in which the discharge from them will be directed simultaneously in a rearward direction to produce forward thrust and positions in which the discharge will be directed substantially forwardly and means for rotating said nozzles in synchronism between said positions but in opposite senses such that during transition the discharge from one nozzle will be directed generally upwardly relative to the power plant and the discharge from the other nozzle will be directed generally downwardly relative thereto, wherein the power plants are disposed symmetrically on either side of the aircraft fuselage and the turbine-efflux discharge nozzles are located on the inboard sides of the power plants and the by-pass discharge nozzles are located on the outboard sides of the power plants.

6. A thrust vector control assembly of the character described for varying the magnitude and direction of the thrust vector of an aircraft of either the vertical or short take-off and landing type having a propulsion system with at least one outlet for thrust production, including at least two reaction nozzles adapted to be rotatably mounted on the aircraft gas outlet in relatively close adjacent relation, and control means operatively connected to said reaction nozzles to simultaneously rotate the nozzles in equal but opposite directions relative to each other in one direction, from a position of zero thrust wherein the nozzles are directed in opposite direction, to a position of substantial alignment in the same direction to produce a maximum thrust in a first direction, and said control means operatively connected to simultaneously rotate the nozzles in equal but opposite directions relative to each other in the opposite direction from the zero thrust position to a position of substantial alignment with each other in the opposite direction to produce a maximum thrust in a second direction opposite to the thrust in the first direction, to thereby vary the magnitude and direction of the thrust vector of the aircraft.

7. A thrust vector control assembly of the character described for use in combination with a gas generating fuel system means, comprising, a main tube connected to receive the gases of combustion from the fuel system means, a pair of reaction nozzles rotatably mounted on said main tube, a plurality of ports formed in the main tube registering with the nozzle inlets, and control means operatively connected to the nozzles for simultaneously rotating the nozzles between 0° and 180° relative to each other, whereby the maximum resultant thrust developed by the nozzles is attained when the nozzles are 0° relative to each other, and the resultant thrust is zero when the nozzles are 180° relative to each other.

8. A thrust vector control assembly according to claim 7, wherein the nozzles are disposed at an angle to the transverse axis of the tube.

References Cited

UNITED STATES PATENTS

| 3,025,667 | 3/1962 | Moorehead | 239—265.25 |
| 3,109,609 | 11/1963 | Dornier | 60—35.55 XR |
| 3,164,337 | 1/1965 | Hooper | 60—35.55 XR |

CARLTON R. CROYLE, Primary Examiner

U.S. Cl. X.R.

60—232; 239—265.25, 265.35; 244—52